(12) United States Patent
Boer et al.

(10) Patent No.: US 7,448,601 B2
(45) Date of Patent: Nov. 11, 2008

(54) GAS DISTRIBUTOR FOR A REACTOR

(75) Inventors: Anne Boer, Amsterdam (NL); Franciscus Johannes Maria Schrauwen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/591,780

(22) PCT Filed: Mar. 7, 2005

(86) PCT No.: PCT/EP2005/050999

§ 371 (c)(1), (2), (4) Date: Apr. 24, 2007

(87) PCT Pub. No.: WO2005/084790

PCT Pub. Date: Sep. 15, 2005

(65) Prior Publication Data

US 2007/0254965 A1    Nov. 1, 2007

(30) Foreign Application Priority Data

Mar. 8, 2004    (EP)    .................... 04251320

(51) Int. Cl.
*B01F 3/04* (2006.01)
(52) U.S. Cl. .................. 261/77; 261/121.1; 261/124
(58) Field of Classification Search .............. 261/76, 261/77, 124, 121.1, 127, 140.1, 140.2
See application file for complete search history.

(56) References Cited

U.S. PATENT DOCUMENTS

| | | | | |
|---|---|---|---|---|
| 286,735 A | * | 10/1883 | Rossler | .................. 423/557 |
| 672,094 A | * | 4/1901 | Cliffton | .................. 126/379.1 |
| 2,526,651 A | | 10/1950 | Garbo | .................. 260/449.6 |
| 2,883,169 A | * | 4/1959 | Daman | .................. 261/77 |
| 3,656,543 A | | 4/1972 | Wolowodiuk et al. | .......... 165/74 |
| 3,870,099 A | | 3/1975 | Wolowodiuk | ................ 165/82 |
| 4,060,127 A | | 11/1977 | Savin et al. | .................. 165/145 |
| 4,801,424 A | * | 1/1989 | Schweiger | ................... 376/283 |
| 4,960,546 A | * | 10/1990 | Tharp | ....................... 261/122.1 |
| 4,965,051 A | | 10/1990 | Shukunobe et al. | .......... 422/145 |
| 5,062,458 A | * | 11/1991 | Rohleder et al. | .............. 141/70 |
| 5,324,335 A | | 6/1994 | Benham et al. | ............... 44/452 |

(Continued)

FOREIGN PATENT DOCUMENTS

DE    3245318    6/1984

(Continued)

OTHER PUBLICATIONS

International Search Report dated May 3, 2005 (PCT/EP2005/050999).

(Continued)

*Primary Examiner*—Scott Bushey

(57) ABSTRACT

A sparger system (10) for a reactor (21) includes a feed pipe arrangement for feeding reactants to the spargers on the floor of the reactor, via a distribution system disposed above the spargers. The outlets (12) of the spargers are typically oriented towards the floor or parallel to it in order to eject gas or other reactants across the floor. This reduces settling of catalyst on the floor of the reactor, which improves mixing of the slurry and reduces the problems associated with uncontrolled reactions.

8 Claims, 3 Drawing Sheets

U.S. PATENT DOCUMENTS

| | | | | |
|---|---|---|---|---|
| 5,527,473 | A | 6/1996 | Ackerman | 210/767 |
| 5,925,293 | A * | 7/1999 | Howk | 261/93 |
| 6,333,019 | B1 * | 12/2001 | Coppens | 423/659 |
| 6,344,490 | B1 | 2/2002 | DeGeorge et al. | 518/700 |
| 6,423,218 | B1 * | 7/2002 | Lindermeir et al. | 210/170.09 |
| 6,797,039 | B2 * | 9/2004 | Spencer | 95/153 |
| 2003/0001295 | A1 * | 1/2003 | Okajima et al. | 261/124 |
| 2003/0057132 | A1 | 3/2003 | Wittenbrink et al. | 208/24 |
| 2003/0080446 | A1 * | 5/2003 | Cheng | 261/77 |
| 2003/0087970 | A1 | 5/2003 | Wittenbrink et al. | 518/728 |
| 2004/0123738 | A1 * | 7/2004 | Spencer | 95/236 |

FOREIGN PATENT DOCUMENTS

| | | |
|---|---|---|
| EP | 0609079 | 7/1998 |
| EP | 0592176 | 12/1998 |
| EP | 956126 | 11/1999 |
| GB | 281224 | 10/1928 |
| GB | 787123 | 12/1957 |
| WO | WO9416807 | 8/1994 |
| WO | 9626003 | 8/1996 |
| WO | 9837168 | 8/1998 |
| WO | 2000066257 | 11/2000 |
| WO | 2002022249 | 3/2002 |

OTHER PUBLICATIONS

Wang Dingzu, "Development Status of Catalytic Process and Production of Hydrocarbon From Syngas," Coal Conversion, vol. 16, No. 3, Aug. 1993.

* cited by examiner

GAS DISTRIBUTOR FOR A REACTOR

PRIORITY CLAIM

The present application claims priority on European Patent Application 04251320.0 filed 8 Mar. 2004.

FIELD OF THE INVENTION

The present invention relates to a sparger system for use in a reactor. In particular, the invention relates to gas sparger system suitable for a reactor to be used for exothermic reactions such as Fischer-Tropsch reactions, as well as to hydrocarbons and fuels derived from these hydrocarbons, which can be made by the hydrogenation of carbon monoxide in a process using the reactor and the sparger system.

Background of the Invention

The Fischer-Tropsch process is often used for the conversion of hydrocarbonaceous feed stocks into liquid and/or solid hydrocarbons. The feed stock (e.g. natural gas, associated gas, coal-bed methane, residual (crude) oil fractions and/or coal) is converted in a first step into a mixture of hydrogen and carbon monoxide (this mixture is often referred to as synthesis gas or syngas). The synthesis gas is then fed into a reactor where it is converted in a second step over a suitable catalyst at elevated temperature and pressure into paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi tubular fixed bed reactors, fluidised bed reactors, such as entrained fluidised bed reactors and fixed fluidised bed reactors, and slurry bed reactors such as three-phase slurry bubble columns and ebulated bed reactors.

The Fischer-Tropsch reaction is very exothermic and temperature sensitive with the result that careful temperature control is required to maintain optimum operation conditions and desired hydrocarbon product selectivity.

The heat transfer characteristics of fixed-bed reactors, e.g. multi tubular fixed bed reactors, are generally poor because of the relatively low mass velocity, small particle size and low thermal capacity of fluids. If one attempts, however, to improve the heat transfer by increasing the gas velocity, a higher CO conversion can be obtained, but there is an excessive pressure drop across the reactor, which limits commercial viability. In order to obtain the CO conversions desired and gas through-puts of commercial interest, the conditions result in substantial radial temperature gradients. For that reason, the Fischer-Tropsch fixed-bed reactor tubes should have a diameter of less than 7 or even 5 cm to avoid excessive radial temperature profiles. The desired use of high-activity catalysts in Fischer-Tropsch fixed-bed reactors makes the situation even worse. The poor heat transfer characteristics make local runaways (hotspots) possible, which may result in local deactivation of the catalyst. In order to avoid runaway reaction the maximum temperature within the reactor must be limited. However, the presence of temperature gradients within the reaction mixture means that much of the catalyst may be operating at sub-optimal levels.

The use of liquid recycles as a means of improving the overall performance in a fixed-bed design has been described. Such a system is also called a "trickle bed" reactor (as part of a sub set of fixed-bed reactor systems) in which both reactant gas and liquid are introduced (preferably in a down flow orientation with respect to the catalyst) simultaneously. The presence of the flowing reactant gas and liquid improves the reactor performance with respect to CO conversion and product selectivity. A limitation of the trickle bed system (as well as of any fixed-bed design) is the pressure drop associated with operating at high mass velocities. The gas-filled voidage in fixed-beds (typically less than 0.50) and size and shape of the catalyst particles does not permit high mass velocities without excessive pressure drops. Consequently, the mass through-put undergoing conversion per unit reactor volume is limited due to the heat transfer rates. Increasing the individual catalyst particle size may slightly improve the heat transfer by allowing higher mass velocities (for a given pressure drop), but the loss in selectivity towards the high boiling point products and the increase in methane selectively combined with the increase in catalyst activity generally offset the commercial incentives of higher heat transfer.

Three-phase slurry bubble column reactors generally offer advantages over the fixed-bed design in terms of heat transfer characteristics. Such reactors typically incorporate small catalyst particles suspended by upward flowing gas in a liquid continuous matrix. A plurality of cooling tubes are present in three phase slurry systems. The motion of the continuous liquid matrix allows sufficient heat transfer to achieve a high commercial productivity. The catalyst particles are moving within a liquid continuous phase, resulting in efficient transfer of heat generated from catalyst particles to the cooling surfaces, while the large liquid inventory in the reactor provides a high thermal inertia, which helps prevent rapid temperature increases that can lead to thermal runaway.

One or more gas spargers, typically situated at or near the bottom of the suspension zone, should ensure adequate distribution of the feed gas through the suspension zone. Examples of known gas spargers are a porous plate and an arrangement of porous tubes. The pores in the plate or tubes are large enough to ensure adequate passage of gas, but small enough to prevent solid particles from entering the pores. However, significant clogging of pores may occur e.g. due to solid particles attrition or failure of the gas feed supply. Furthermore, the relatively small pores give rise to high pressure drops across the pores.

Other known gas spargers include dynamic gas jets, such as ejector jets and slit jets. Problems associated with such gas spargers include the danger of drainage of liquid/solid suspension from the suspension zone into the gas supply system in case of failure of the gas feed supply. This danger exists in those cases in which the gas outlets are situated above the gas supply system or at the same level of the gas supply system.

An overview of known gas spargers has been published in "Bubble Column Reactors" by W.-D. Deckwer, 1992, John Wiley & Sons, pages 9-13. Spargers are also described in EP-A-956126. In GB 787,123 an injection system is described using a line provided with simple nozzle or jets. The gas outlets, however, are at the same level of the injection line. Thus, a small pressure difference may result in the direct ingress of the slurry in the injection line.

The gas sparger of the present invention aims to solve problems associated with prior art gas spargers.

SUMMARY OF THE INVENTION

Thus, in the sparger system according to the present situation the gas outlets (i.e. the openings where the gas leaves the sparger system and is where the gas is introduced into the slurry) are situated well below a gas distribution system to avoid ingress of the slurry into the distribution system. In this respect it is observed that the ingress of slurry may result in depositions of catalyst particles inside the sparger system. In the absence of liquid heat transfer medium, and in the presence of the large amounts of hydrogen and carbon monoxide, the said catalyst particles or catalyst deposits continue to catalyse the exothermic reaction. In this way, local hot spots are created which may damage the sparger system. In addition, coke deposits may be formed. Especially after long run times during which regularly ingress of slurry into the sparger system occurs, considerable amounts of coke may be formed, which could result in (partial) blockage of one or more pipes in the sparger system. This should be avoided.

Accordingly, the present invention provides a sparger system for use in a reactor, the sparger system comprising a gas outlet for passing gas into the reactor, and a gas distribution system to supply the gas to the outlet, wherein the gas distribution system feeding a sparger with gas to be ejected from the gas outlet is disposed above the sparger outlet in the system.

The sparger system is typically useful in reactors for carrying out exothermic reactions.

BRIEF DESCRIPTION OF THE DRAWINGS

Without wishing to be restricted to a particular embodiment, the invention will now be described in further detail with reference to the drawings in which.

DETAILED DESCRIPTION OF THE INVENTION

Figure 1:
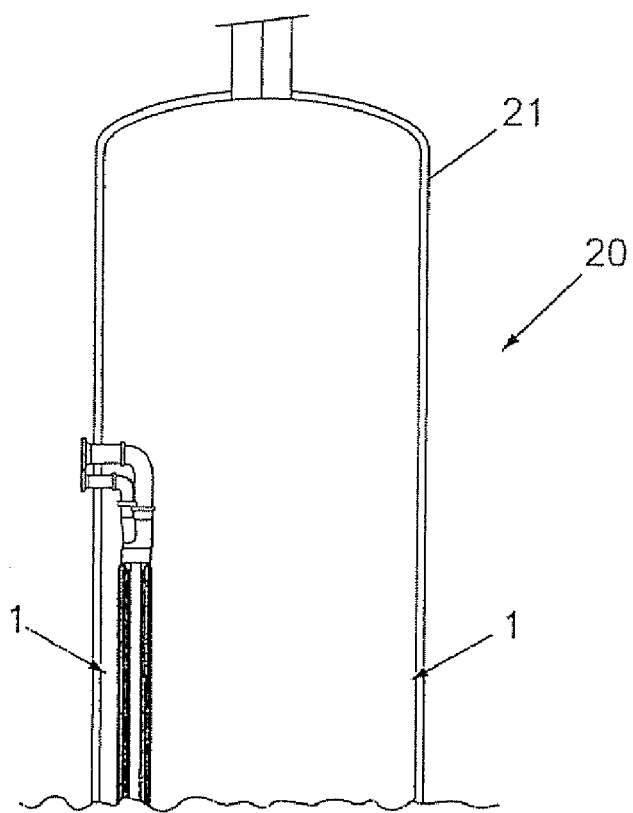
FIG. 1 is a side view of a general arrangement of a reactor having a sparger system.
Figure 1:
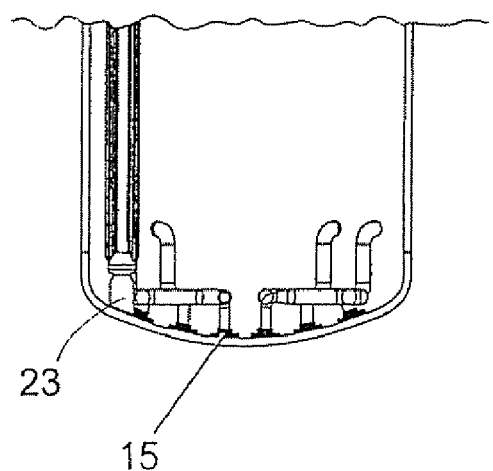

Typically the sparger outlet is disposed as close as possible to the floor of the reactor, typically at a distance of 20 cm or less, and more preferably at a distance of 10 cm or less. In addition, all sparger gas outlets are suitably situated at least 15 cm below the distribution system, preferably all sparger outlets are situated at least 30 cm below the distribution system. Usually the sparger outlets are between 0.5 and 5 m below the distribution system, preferably between 1 and 3 m. Usually the sparger and the sparger outlets are at about the same level in the reactor. Suitably the height difference in a (vertical) reactor between the centre of the central space of the sparger is less than 40 cm, preferably less than 30 cm, more preferably less than 20 cm.

The gas distribution system suitably comprises an arrangement of pipes to provide gas to the spargers. An examples is a (large) horizontal distributor pipe provided with a plurality of (small) horizontal side pipes, each side provided with one or more vertical pipes which are connected to the spargers, which spargers are situated close to the bottom of the reactors. Another example in a horizontal circular distributor pipe provided with a plurality of vertical pipes, which end close to the bottom of the reactor, the vertical pipes at the end connected with e.g. two or four horizontal pipes which are connected to the spargers. Other examples are shown in the figures. The gas distribution systems are provided with a gas supply pipe which is connected through the reactor wall with an external gas supply system. The connection via the reactor wall is suitably at the same level of e.g. the horizontal distributor pipe, but is preferably at a higher level. Suitably the gas supply connection via the reactor wall is 0.3 to 8 m above the sparger outlets, preferably 0.5 to 5 m, more preferably 1 to 3 m. In an exceptional case a long elongated pipe may be used which enters the reactor at the top. In some cases one gas supply pipe may be used, in other cases a plurality, e.g. 2-10, may be used. A reactor may be provided with one sparger system or with a plurality of sparger systems, e.g. 2 to 16, especially 4 to 12.

In the present application a sparger is a device that introduces the gas via one or more sparger outlets into the slurry. There is a central space which is in fluid connection with the gas distribution means and in fluid connection with the sparger outlets (or gas outlets). The gas distribution means comprises the gas distribution system and usually the distribution conduit means. The spargers may be connected directly with the distribution system or, preferably, via the distribution conduits. In most situations the distribution system in one (horizontal) plane, perpendicular to the (vertical) reactor axis. The sparger is not a part of the distribution system. Thus, a distribution system consisting of a central distributor pipe provided with gas outlet means does not fall within the scope of the claims as no sparger is present.

The sparger systems according to the invention have the advantage that no moving parts are necessary inside the reactor. The gas flow can be controlled outside the reactor. Thus, preferably no moving parts are present in the reactor, or, all elements used are static elements.

Further, as the gas supply connection via the reactor, which is the highest point of the gas distribution system, is situated above the sparger outlets, there is a natural barrier against inflow of slurry into the spargers and the gas distribution system. In a further preferred embodiment the gas supply connections via the reactor wall are located in the vertical cylindric reactor wall, preferably at least 0.2 m, more preferably between 0.3 and 2 m above the transition of the vertical cylindric wall into, usually dome or spherically shaped, the bottom of the reactor.

The invention also provides a reactor incorporating a sparger according to the above aspect of the invention.

In certain embodiments the sparger outlet is located at the end of the sparger which is in turn at the end of a distribution conduit feeding the gas to the sparger.

Typically the gas outlet is adapted to eject gas across the floor of the reactor.

Sweeping the floor of the reactor with the gas ejected from the sparger outlet has the advantage of enhancing the distribution of the catalyst within the reactor, improving mixing in the bottom of the reactor, which is beneficial for the transfer of heat to the cooling modules and avoids local hot spots. It also disperses any particles of catalyst from the floor, which avoids localised build-up of catalyst and localised hotspots that can occur in that zone as a result.

In reactors that are particularly adapted for carrying out exothermic reactions, and which have cooling means to control the heat generated as a result of the exothermic reactions, the sweeping of the catalyst from the floor of the reactor therefore circulates the catalyst only in the zone above the sparger outlets, where coolant circulation tubes normally predominate in such reactors, so that most of the exothermic reactions occur in zones of the reactor that are dense in coolant circulation tubes. This facilitates the control of the reaction and reduces the liability for hotspots in areas that are uncontrolled by cooling means.

The arrangement of the sparger outlet below the gas distributor system also facilitates mixing and removal of heat in the lower areas of the reactor adjacent to the floor of the reactor, and prevents build-up of wax or by-products there, while also settling of catalyst is prevented.

Typically the gas outlets are disposed parallel to or directed towards the lower inner surface of the reactor. Each sparger device typically has a number of outlets (e.g. 6-12) directed outwardly from a sparger head, and the outlets are typically arranged equidistantly from one another around the periphery of the sparger head such that gas jets leaving the outlets sweep the surrounding area of the reactor uniformly. It would be possible for the gas jet from the outlet to be oriented directly towards the floor surface in some embodiments.

The sparger heads are typically spaced apart from one another on the floor of the reactor in a regular pattern. The pattern and density of the sparger heads, and the speed of the gas jets leaving the sparger heads are typically selected so that the gas jets have sufficient radial penetration into the slurry surrounding the heads to ensure sufficient coverage of the reactor cross-section, but also so that the gas injection velocity is limited to avoid catalyst attrition.

The gas outlets typically incorporate a flow controlling means such as an orifice to regulate the speed of the gas jet through the outlet. The orifices are typically Venturi type orifices, and may optionally incorporate a check valve to limit the flow of slurry into the outlet. In order to limit the injection velocity of the gas from the outlet and thereby reduce catalyst attrition the outlet orifice is typically shrouded by a larger diameter shroud pipe that extends beyond the orifice for a minimum distance dependent on the desired injection velocity and the dimensions of the sparger, so that the kinetic energy of the gas jet leaving the orifice is dissipated to some extent in the shroud pipe, before entering the slurry. Typically the floor of the reactor is concave and the positioning of straight gas outlet shroud pipes generally parallel to a tangent on the curve of the floor will normally involve the gas jets being directed towards the floor as they leave the outlet, thereby enhancing the sweeping function.

According to a further aspect, the invention provides a method for carrying out a reaction comprising the steps of charging a reactor with reactants and removing the reaction products from the reactor, wherein at least some of the reactants are fed into the reactor via a sparger device, which ejects the reactants through an outlet, and wherein the sparger device is fed with reactants via a distribution system that is disposed above the sparger.

Another possibility to remove any catalyst particles present in the sparger system in the injection of suitable liquids into the gas stream that flows through the sparger system. This can be done intermittently or continuously. Suitable injection liquids are hydrocarbons, especially hydrocarbons made in a Fischer-Tropsch process. Directly obtained hydrocarbons may be used, e.g. reactor wax obtained via filtration of the slurry, or distillate fractions, distilling in the range between 120 and 500° C., especially between 150 and 360° C. Also hydrogenated and/or hydrocracked fractions may be used, these fractions boiling between 120 and 500° C., especially between 150 and 360° C. These injection liquids are preferably injected via an injection nozzle outside the reactor. Due to the fact that the flow pattern of the gas in the sparger system is downwardly directed, the injected liquid will wash away any catalyst particles and/or catalyst deposits which may be present in the system. In a preferred embodiment the injection liquid is heated to a temperature between 100 and 250° C., more preferably between 150 and 225° C.

Figure 2:
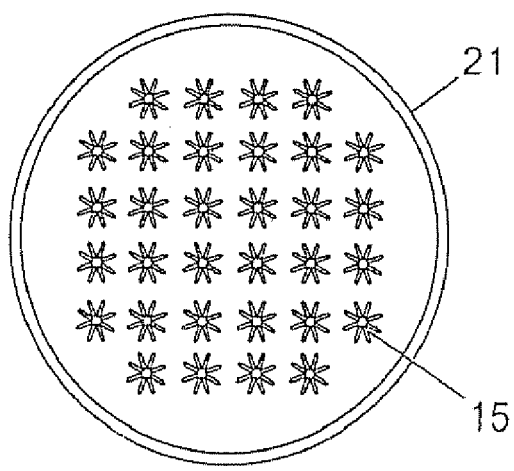
FIG. 2 is plan view of the spargers at the base of the FIG. 1 reactor.
Figure 3:
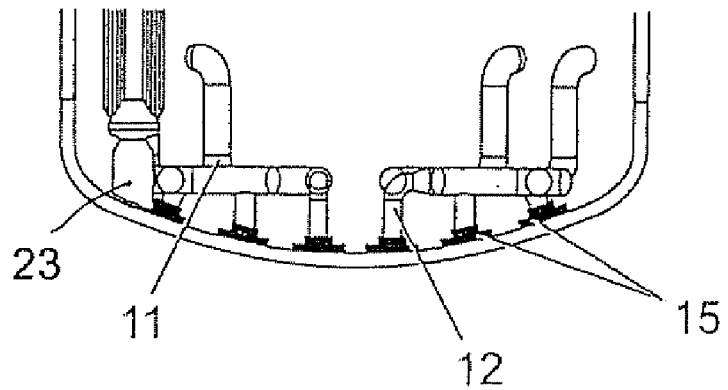
FIG. 3 is a side view of the FIG. 2 spargers.
Figure 4:
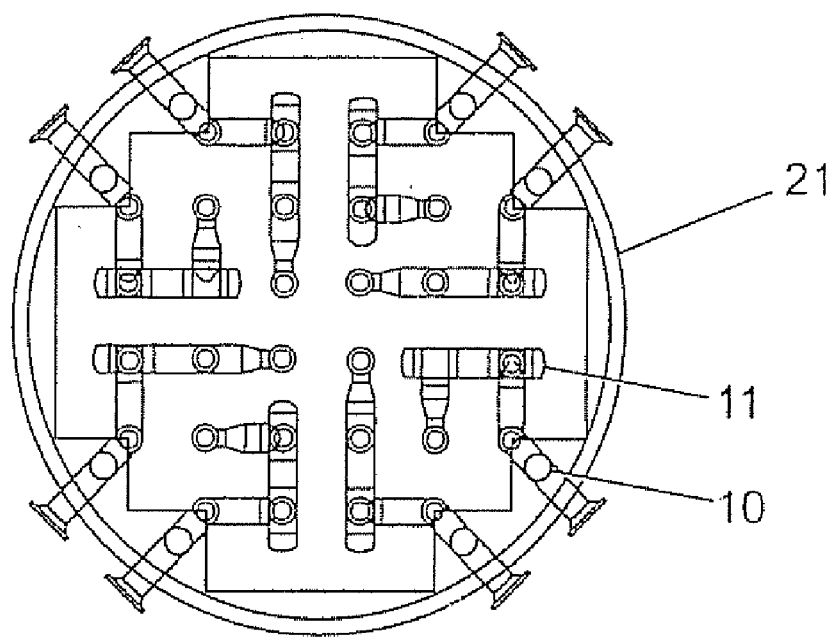
FIG. 4 is a plan view of the sparger pipework.
Figure 5:
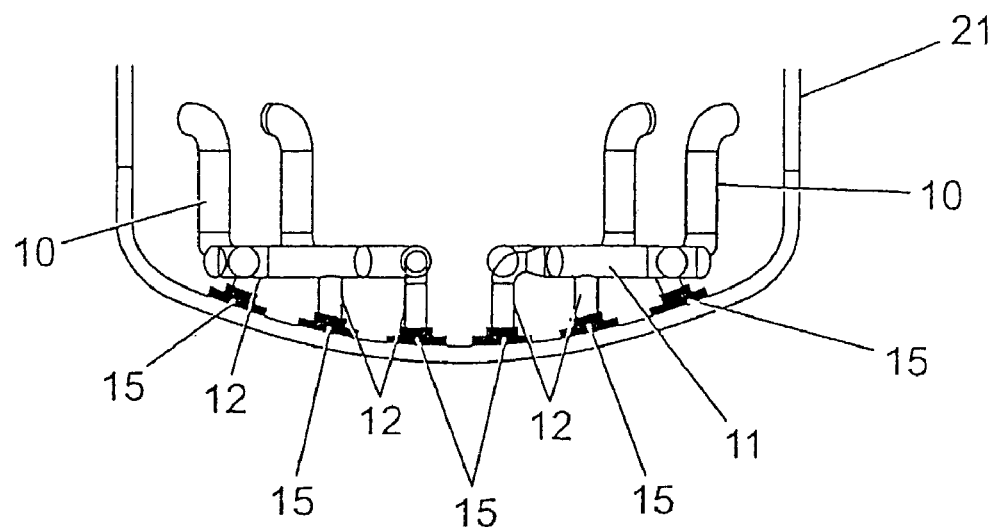
FIG. 5 is a side view of the sparger pipework.

Without wishing to be restricted to a particular embodiment, the invention will now be described in further detail with reference to the drawings in which:

FIG. 1 is a side view of a general arrangement of a reactor having a sparger system;

FIG. 2 is plan view of the spargers at the base of the FIG. 1 reactor;

FIG. 3 is a side view of the FIG. 2 spargers;

FIG. 4 is a plan view of the sparger pipework;

FIG. 5 is a side view of the sparger pipework; and

Figure 6:
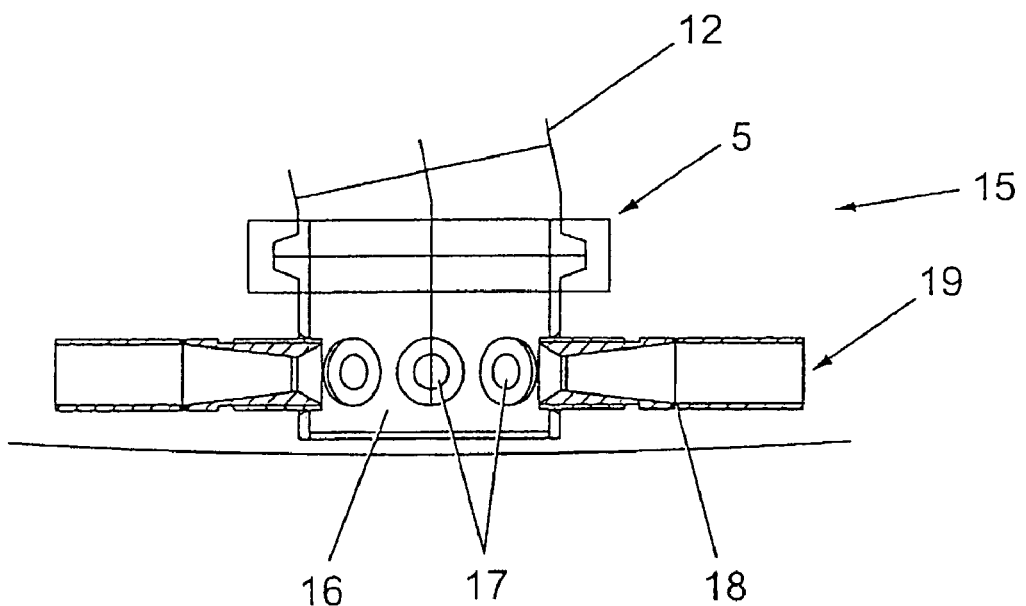
FIG. 6 is a side view of a sparger head.

FIG. 6 is a side view of a sparger head.

Turning now to FIG. 1 a reactor 20 has an outer shell 21 defining a chamber into which reactants are delivered. The reactor in this embodiment is typically used for carrying out three phase slurry reactions, such as for example Fisher Tropsch type reactions. Liquid phase reactants and solid particulate catalyst are fed into the reactor chamber from feed pipes (not shown), and gas phase reactants are delivered into the reactor by means of an arrangement of gas spargers 15 disposed on the floor of the reactor. The spargers 15 have outlets that emit bubbles of gas which rise in the liquid phase and interact with the solid particulate catalyst in the liquid phase to form reaction products, which are removed from the reactor.

Since the Fischer-Tropsch reaction is exothermic, the reactor 20 houses a number of cooling modules 1 (only one shown for clarity) for delivering and circulating coolant through the circulation system of coolant pipes within the reactor shell 21. Cooling modules 1 are supported from below by saddles resting on the floor of the reactor shell 21. Heat is transferred from the slurry surrounding the cooling modules 1 to the coolant as it passes through the circulation system of the module. Suitable coolants will be known to the person skilled in the art and include for example water/steam or oil based coolants.

Synthesis gas (or syngas) is preferably fed into the reactor at a low level in the reactor, optionally as close as possible to the short-radius zone of the dished floor of the reactor, as shown in FIG. 3, provided that this is above the syngas outlets into the reactor 20. External syngas feed pipes can be connected to flanges on the shell 21 at the point of entry to the reactor by means of c-clamps 5 of the same design used to connect coolant pipework, thereby minimising design variations throughout the reactor. Syngas is then fed via distributor pipes 10 (clamped together at the flanges by means of c-clamps 5) to a gas manifold 11 at the floor of the reactor 20. Each manifold 11 is fed by a single distributor pipe in the example shown, but a single distributor pipe could feed a number of manifolds if desired. Each manifold 11 is connected to and supports a number of spargers 15 (e.g. four) which it feeds with syngas via sparger feed tubes 12. Sparger feed tubes 12 are connected to the spargers by means of the c-clamps 5.

The spargers 15 are arranged in a uniform pattern over the floor of the reactor 20 as shown in FIG. 5, and are typically arranged around the saddles 23. Each sparger 15 has central chamber 16 with eight orifices 17. Each of the orifices is connected via a narrow Venturi-type throat to a shroud pipe 18 with a wider diameter and having an outlet 19 to the reactor. Each shroud pipe 18 is arranged parallel to the floor of the reactor shell 21. In some embodiments the shroud pipes 18 can be directed at a shallow angle toward the floor of the reactor shell 21.

In operation, syngas is fed through the distributor pipes 10 into the manifolds 11 and sparger feed pipes 12 and into the spargers 15. Through the central chamber of the sparger 16, the syngas is distributed uniformly through the orifices 17 and Venturis and into the shroud pipes 18. The Venturi restricts the entrance of slurry (and especially catalyst) into the orifice.

Optionally a check valve (not shown) may be located at some point in the gas feed or distribution system (typically outside the reactor so that moving parts are kept out of the reactor shell) in order to prevent catalyst penetration into the syngas distribution system.

Bends in the manifolds 11 are preferably avoided if possible but are occasionally necessary to connect the manifold with each sparger 15. In that event, bends are typically made in the horizontal plane of the manifold, rather than in the vertical plane, as shown in FIG. 5. This maximises downflow in the gas feed distribution system to the spargers 15, which has the advantage of reducing the slurry ingress into the feed system. This limits further the catalyst entry into the gas feed system and consequential fouling, blockages and uncontrolled heat production due to the exothermic reaction between the liquid reactants in the slurry and the syngas in the feed system. Small backflows of slurry into the spargers 15 or the feed pipes can be combated by maintaining the positive pressure of the gas, and by occasional purging of the gas feed system.

The gas jets leaving the Venturi dissipate to some extent in the shroud pipes 18 due to the wider diameter and the length of the shroud pipe 18, until regular flow develops in the shroud pipe 18 downstream of the Venturi. Larger pipes can be used to reduce the injection velocity and pressure accordingly. The diameter and length of the shroud pipe 18 is chosen in conjunction with the desired gas injection velocity and the pattern and number of spargers to reduce the exit velocity from the outlet of the pipe 18 to an acceptable level that is high enough to ensure adequate radial penetration of the gas into the slurry to achieve the effects of catalyst dispersion from the floor of the reactor, but low enough so as to avoid excessive catalyst attrition. In this example, which is representative for the standard use of the reactor and the sparger system, the syngas flow at the inlet to the distribution system is around 5-10 m$^3$/sec at reaction conditions. The diameter of the orifice 17 is around 30-40 mm and the shroud pipe 18 is at least 200 mm long and has an ID of around 40-60 mm. Feed gas velocity across the spargers is limited to a maximum of around 5-15 m/s. It will be understood that these figures are optional and not limiting.

The spargers 15 in this embodiment each have eight outlets 19, and are arranged in a regular pattern of 32 spargers across the floor of the reactor 20. This arrangement ensures that substantially the whole of the floor of the reactor is uniformly fed with syngas at a slight overpressure with respect to the rest of the reactor contents, which avoids the settling of catalyst.

In preferred embodiments the spargers are positioned at the same distance from the bottom of the reactor, e.g. either physically supported on the reactor floor, or (preferably) supported from above a few mm above it on the feed pipes 12. This means that with reactor shells having concave floors there will be a slight hydrostatic pressure difference between those spargers at the central axis of the reactor, where the concave surface is the deepest, and those at the periphery of the floor, near the transition between the floor surface and the wall of the reactor shell 21. This hydrostatic pressure difference can affect the uniformity of the gas distribution from the sparger 15, and to compensate for this effect, the floor of the reactor shell 21 typically has a 1:2 height/diameter ratio. Also the orifices of the spargers 15 in the centre of the reactor (or elsewhere) are typically modified to equalise the gas jet velocity and pressure over all of the spargers 15 in the reactor 20.

Typically the sparger feed tubes 11 have a relatively wide diameter in order to avoid pressure losses in the distribution system affecting the gas jet velocity from the spargers 15.

In preferred embodiments the spargers are positioned in between the saddles 23 for supporting the cooling modules as shown in FIG. 5, and are fed from above via feed pipes 10 that are as straight as possible. This configuration helps the sparger outlets 19 to be positioned very close to the floor of the reactor shell 21, as no feed pipework or support structure needs to be located between the sparger and the floor of the reactor. In this example the sparger outlets 19 are less than 10 cm (e.g. 5 cm) above the floor of the shell 21. The sparger distribution pattern on the floor of the reactor 20 is typically chosen to match as far as possible the patter of the cooling modules in the reactor (shown as an outline shape in FIG. 4), so that the reaction between the injected syngas and the other reactants in the presence of the suspended catalyst takes place as far as possible in the vicinity of the cooling modules. This helps to reduce reaction hotspots where too much syngas is added to one particular area for the cooling capacity of that area to control the reaction.

In preferred embodiments the spargers 15 are identical and interchangeable, and the same c-clamp connections are used on flanged pipes throughout the reactor.

Modifications and improvements can be incorporated without departing from the scope of the invention. For example, the average particle size of the catalyst particles may vary between wide limits, depending inter alia on the type of slurry zone regime. Typically, the average particle size may range from 1 µm to 2 mm, preferably from 1 µm to 1 mm.

If the average particle size is greater than 100 µm, and the particles are not kept in suspension by a mechanical device, the slurry zone regime is commonly referred to as ebulating bed regime. Preferably, the average particle size in an ebulating bed regime is less than 600 µm, more preferably in the range from 100 to 400 µm. It will be appreciated that in general the larger the particle size of a particle, the smaller the chance that the particle escapes from the slurry zone into the freeboard zone. Thus, if an ebulating bed regime is employed, primarily fines of catalyst particles will escape to the freeboard zone.

If the average particle size is at most 100 µm, and the particles are not kept in suspension by a mechanical device, the slurry zone regime is commonly referred to as a slurry phase regime. Preferably, the average particle size in a slurry phase regime is more than 5 µm, more preferably in the range from 10 to 75 µm.

If the particles are kept in suspension by a mechanical device, the slurry zone regime is commonly referred to as stirred tank regime. It will be appreciated that in principle any average particle size within the above ranges can be applied. Preferably, the average particle size is kept in the range from 1 to 200 µm.

The concentration of catalyst particles present in the slurry may range from 5 to 45% by volume, preferably, from 10 to 35% by volume. It may be desired to add in addition other particles to the slurry, as set out in for example European Patent Application Publication No. 0 450 859. The total concentration of solid particles in the slurry is typically not more than 50% by volume, preferably not more than 45% by volume.

Suitable slurry liquids are known to those skilled in the art. Typically, at least a part of the slurry liquid is a reaction product of the exothermic reaction. Preferably, the slurry liquid is substantially completely a reaction product.

The exothermic reaction is a reaction which is carried out in the presence of a solid catalyst, and which is capable of being carried out in a three-phase slurry reactor. Typically, at least one of the reactants of the exothermic reaction is gaseous. Examples of exothermic reactions include hydrogenation reactions, hydroformylation, alkanol synthesis, the preparation of aromatic urthanes using carbon monoxide, Kölbel-Engelhardt synthesis, polyolefin synthesis, and Fischer-Tropsch synthesis. According to a preferred embodiment of the present invention, the exothermic reaction is a Fischer-Tropsch synthesis reaction.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ratio is in the range from 1.0 to 2.5.

The gaseous hourly space velocity may very within wide ranges and is typically in the range from 1500 to 10000 Nl/l/h, preferably in the range from 2500 to 7500 Nl/l/h.

The Fischer-Tropsch synthesis is preferably carried out in a slurry phase regime or an ebulating bed regime, wherein the catalyst particles are kept in suspension by an upward superficial gas and/or liquid velocity.

It will be understood that the skilled person is capable to select the most appropriate conditions for a specific reactor configuration and reaction regime.

Preferably, the superficial gas velocity of the synthesis gas is in the range from 0.5 to 50 cm/sec, more preferably in the range from 5 to 35 cm/sec.

Typically, the superficial liquid velocity is kept in the range from 0.001 to 4.00 cm/sec, including liquid production. It will be appreciated that he preferred range may depend on the preferred mode of operation.

According to one preferred embodiment, the superficial liquid velocity is kept in the range from 0.005 to 1.0 cm/sec.

We claim:

1. A sparger system for use in a reactor, the sparger system comprising a gas outlet for passing gas into the reactor, and a gas distribution system to supply the gas to the outlet, wherein the gas distribution system feeding the sparger with gas to be ejected from the gas outlet is disposed above the sparger outlet in the system, wherein the sparger gas outlets are situated at least 15 cm below the distribution system, and wherein the distance between the gas outlet and the reactor floor is less than 20 cm and wherein the gas distribution system has a gas supply connection via the reactor wall 0.3 to 8 m above the sparger outlets.

2. The sparger system of claim 1, wherein the gas outlet is adapted to eject gas across the floor of the reactor.

3. The sparger system of claim 1, wherein the sparger outlet is located at the end of the sparger, which is in turn located at the end of a distribution conduit feeding the gas to the sparger.

4. The sparger system of claim 1, wherein the distance between the gas outlet and the reactor floor is less than 10 cm.

5. The sparger system of claim 1, wherein the gas outlet incorporates a flow controlling means to regulate the speed of the gas jet through the outlet.

6. The sparger system of claim 5, wherein the flow controlling means is a Venturi-type orifice having a shroud pipe to limit the injection velocity of the gas.

7. The sparger system of claim 1, wherein each sparger has a plurality of outlets directed outwardly from a sparger head and arranged equidistantly from one another around the periphery of the sparger head.

8. The sparger system of claim 1, wherein the sparger system is used in a reactor with a cooling system and the spargers and cooling system are arranged in corresponding patterns.

* * * * *